(12) United States Patent
Wang

(10) Patent No.: US 8,014,302 B2
(45) Date of Patent: Sep. 6, 2011

(54) COMMUNICATION NODE, COMMUNICATION METHOD, AND COMPUTER PROGRAM

(75) Inventor: Honggang Wang, Kanagawa (JP)

(73) Assignee: Sony Corporation, Tokyo (JP)

( * ) Notice: Subject to any disclaimer, the term of this patent is extended or adjusted under 35 U.S.C. 154(b) by 220 days.

(21) Appl. No.: 12/509,522

(22) Filed: Jul. 27, 2009

(65) Prior Publication Data
US 2010/0020807 A1    Jan. 28, 2010

(30) Foreign Application Priority Data
Jul. 28, 2008    (JP) ................ P2008-193429

(51) Int. Cl.
*H04L 12/26* (2006.01)
*H04L 12/28* (2006.01)
(52) U.S. Cl. ........................ 370/242; 370/258
(58) Field of Classification Search ................ None
See application file for complete search history.

(56) References Cited

U.S. PATENT DOCUMENTS

| 5,546,542 | A  | * | 8/1996 | Cosares et al. ........ 709/241 |
| 6,373,826 | B1 | * | 4/2002 | Russell et al. ........ 370/256 |
| 6,865,149 | B1 | * | 3/2005 | Kalman et al. ........ 370/225 |
| 7,349,351 | B2 | * | 3/2008 | Shachnai et al. ........ 370/255 |
| 2003/0031126 | A1 | * | 2/2003 | Mayweather et al. ........ 370/223 |

FOREIGN PATENT DOCUMENTS

JP    2006-195694    7/2006

* cited by examiner

*Primary Examiner* — Hong Cho
(74) *Attorney, Agent, or Firm* — Frommer Lawrence & Haug LLP; William S. Frommer

(57) ABSTRACT

A communication node includes: a routing information storing unit configured to store, as routing information, node information indicating a succeeding node and a preceding node in a ring network using a distributed hash table; and a routing information updating unit configured to update the node information, wherein when the succeeding node becomes inaccessible, the routing information updating unit acquires node information from one predetermined node accessible on the network at all times, determines, based on the acquired node information, whether the node that has supplied the node information satisfies a determination criterion for becoming its succeeding node, and designates the node that has supplied the node information as its succeeding node if the determination criterion is satisfied, while acquires node information from the preceding node indicated by the acquired node information if the determination criterion is not satisfied, and determines whether the node that has supplied the node information satisfies the determination criterion.

8 Claims, 10 Drawing Sheets

```
n.fix_broken_ring()
n' = node;
    for(;;){
    if(n'.predecessor is nil  or  n∈(n'.predecessor, n')){
      n.successor = n';
      n'.notify(n);
      break;
    }
    else{
      n' = n'.predecessor;
    }
  }
```

```
n' .notify(n)
  if(predecessor is nil  or  n∈(predecessor, n '))
    predecessor = n;
```

```
n.stabilize()
  x = successor.predecessor;
  if(x ∈ (n, successor))
    successor = x;
  successor.notify(n);
```

COMMUNICATION NODE, COMMUNICATION METHOD, AND COMPUTER PROGRAM

BACKGROUND OF THE INVENTION

1. Field of the Invention

This invention relates to a communication node, a communication method, and a computer program. More particularly, even when an inaccessible node occurs in a ring network using a distributed hash table, the invention allows the network to recover automatically by eliminating the inaccessible node.

2. Description of Related Art

In recent years, a P2P (Peer-to-Peer) network, which can ensure scalability by distributing the server function, has become valued increasingly. The P2P network is an overlay network, which is a computer network built over a computer network. It is configured to enable communication without being aware of the IP network topology. When configuring the overlay network, distributed hash technology is used to search a partner (node) to communicate with.

As a representative protocol using the distributed hash technology, Chord is disclosed in "Chord: A Scalable Peer-to-peer Lookup Protocol for Internet Applications" Ion Stoica, Robert Morris, David Liben-Nowell, David R. Karger, M. Frans Kaashoek, Frank Dabek, Hari Balakrishnan, IEEE Transactions on Networking, Vol. 11, February 2003. The Chord is a protocol in which a ring overlay network (hereinafter referred to as a "Chord ring") is constructed by nodes each having a hash value derived from an IP address as a node ID. All the nodes on the Chord ring have routing information for correctly securing communication paths to the nodes on Chord ring. Here, the next clockwise node is called a successor, and the next anticlockwise node is called a predecessor. The information indicating the successor or the predecessor is used as routing information. When the successor and the predecessor indicate correct nodes in each of the nodes, all the nodes are connected correctly, which means that correctness of the Chord ring is ensured.

In addition, JP-A-2006-195694 discloses distribution of content data using a ring overlay network.

SUMMARY OF THE INVENTION

In the Chord, routing cannot be performed correctly when a node in the Chord ring becomes inaccessible for some reason. In view of the problem, JP-A-2006-195694 shows that the number of nodes that store routing information is increased so that routing can be performed correctly even in the case where a node becomes inaccessible. Specifically, a node does not only stores one successor as the routing information, but it also stores, as the routing information, the successor indicated by the successor of this node, further the successor indicated by the successor of that node, and so forth. Thus, in the case where a "Successor-List" containing a plurality of successors is stored as the routing information, the probability that all the successors causes "Failure" and the correctness of the system is lost is decreased to 1/(the r-th power of n), where the size of the "Successor-List" is r and the event probability that each of the successors in the "Successor-List" undergoes a "Node Failure" is 1/n. Thus, by increasing the number of nodes stored as the routing information, the probability that the correctness of the system is lost can be decreased, but the above-described problem cannot be resolved fundamentally.

Accordingly, embodiments of this invention provide communication node, a communication method, and a computer program that enables the network to recover automatically even when an inaccessible node occurs.

An embodiment of the invention provides a communication node including:

a routing information storing unit configured to store node information indicating a succeeding node and a preceding node in a ring network using a distributed hash table; and a routing information updating unit configured to update the node information stored in the routing information storing unit, wherein when the succeeding node becomes inaccessible, the routing information updating unit acquires node information indicating a preceding node from one predetermined node that is made accessible on the network at all times, and based on the acquired node information, the routing information updating unit determines whether or not the node that has supplied the node information satisfies a determination criterion for becoming its succeeding node; the routing information updating unit designates the node that has supplied the node information as its succeeding node if the determination criterion for becoming the succeeding node is satisfied, while the routing information updating unit acquires node information from the preceding node indicated by the acquired node information if the determination criterion for becoming the succeeding node is not satisfied; and the routing information updating unit determines whether or not the node that has supplied the node information satisfies the determination criterion for becoming its succeeding node.

In the communication node of the embodiment of the invention, the routing information storing unit stores node information indicating a succeeding node and node information indicating a preceding node as the routing information in a ring network using a distributed hash table, such as a Chord ring, which is a ring overlay network using the Chord protocol. When the succeeding node becomes inaccessible, the routing information updating unit, which updates the routing information, acquires node information indicating a preceding node from one predetermined node that is made accessible on the network at all times, and it determines whether or not the node that has supplied the node information satisfies a determination criterion for becoming its succeeding node, based on the acquired node information. Here, it is determined that the determination criterion is satisfied and the node that has supplied the node information is designated as its succeeding node, if it is located between the preceding node indicated by the node information and the node that has supplied the node information, or if the node information indicates no preceding node. On the other hand, if the determination criterion is not satisfied, specifically, if it is not located between the preceding node indicated by the node information and the node that has supplied the node information, node information is acquired from the preceding node indicated by the node information, and it is determined whether or not the node that has supplied the node information satisfies the determination criterion for becoming its succeeding node. Using the one predetermined node as the starting point, it is determined whether each of the nodes can become its succeeding node one after another in the direction of the preceding node. If a node satisfies the determination criterion for becoming its succeeding node, the node is designated newly as its succeeding node.

Another embodiment of the invention provides a communication method including the steps of:

acquiring node information indicating a preceding node from a predetermined one node that is made accessible at all times on the network by a routing information updating unit when a succeeding node in a ring network using a distributed hash table becomes inaccessible; and by the routing information updating unit, determining whether or not the node that has supplied the node information satisfies a determination criterion for becoming a succeeding node based on the acquire node information; setting the node that has supplied the node information to be the succeeding node if it satisfies the determination criterion for becoming the succeeding node; acquiring the node information from the preceding node indicated by the acquired node information if it does not satisfy the determination criterion for becoming the succeeding node; and determining whether or not the node that has supplied the node information satisfies the determination criterion for becoming the succeeding node.

A still another embodiment of the invention provides a computer program for causing a computer connected to a ring network using a distributed hash table to execute the steps of:

acquiring node information indicating a preceding node from one predetermined node that is made accessible at all times on the network when a succeeding node on the network becomes inaccessible; and determining whether or not the node that has supplied the node information satisfies a determination criterion for becoming a succeeding node based on the acquire node information; setting the node that has supplied the node information to be the succeeding node if it satisfies the determination criterion for becoming the succeeding node; acquiring the node information from the preceding node indicated by the acquired node information if it does not satisfy the determination criterion for becoming the succeeding node; and determining whether or not the node that has supplied the node information satisfies the determination criterion for becoming the succeeding node.

It should be noted that the computer program of the embodiment of the invention is a computer program that can be provided by storage media and communication media that provide various programs and codes to general-purpose computers and systems that can execute the programs and codes in a computer-readable format: for example, storage media such as optical disks, magnetic disks, and semiconductor memories, or communication media such as a network. By providing such a program in a computer-readable format, a process according to the program is implemented on the computers and the systems.

According to the embodiments of the invention, when an inaccessible node occurs, it is determined whether each of the nodes can become its succeeding node one after another in the direction of the preceding node using one predetermined node that is made accessible on the network at all times as the starting point. If a node satisfies the determination criterion for becoming the succeeding node, the node is designated newly as its succeeding node. As a result, when an inaccessible node occurs, the node information is updated automatically so as to eliminate the inaccessible node, and therefore, the network can be recovered automatically.

DESCRIPTION OF THE PREFERRED EMBODIMENT

Figure 1:
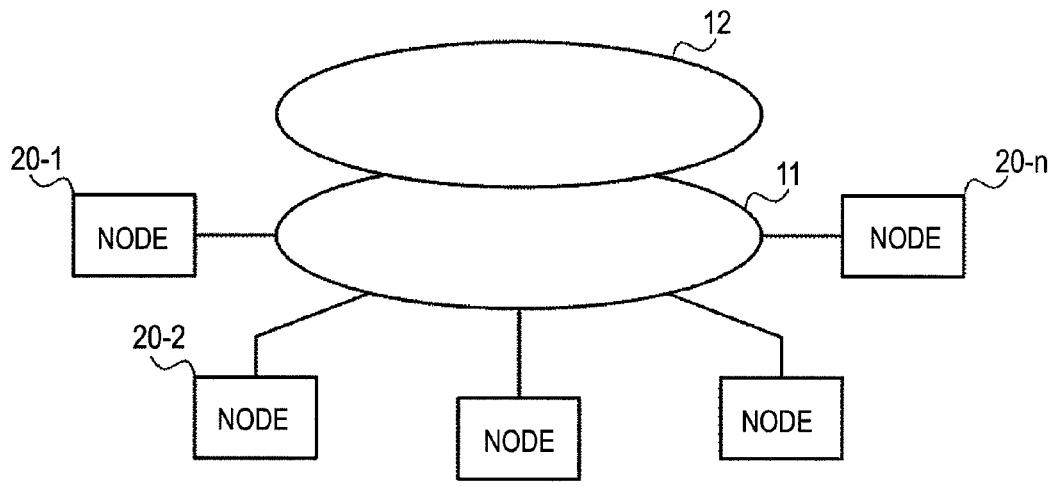
FIG. 1 is a diagram illustrating the configuration of a network system.

Hereinbelow, one embodiment of the invention will be described with reference to the drawings. FIG. 1 shows the configuration of a network system 10. In the network system 10, a plurality of communication nodes 20-1 to 20-$n$ (hereinafter simply referred to as "nodes") are connected to a network 11. In addition, an overlay network 12 is constructed over the network 11, and communication is performed between a plurality of nodes via the overlay network 12.

Figure 2:
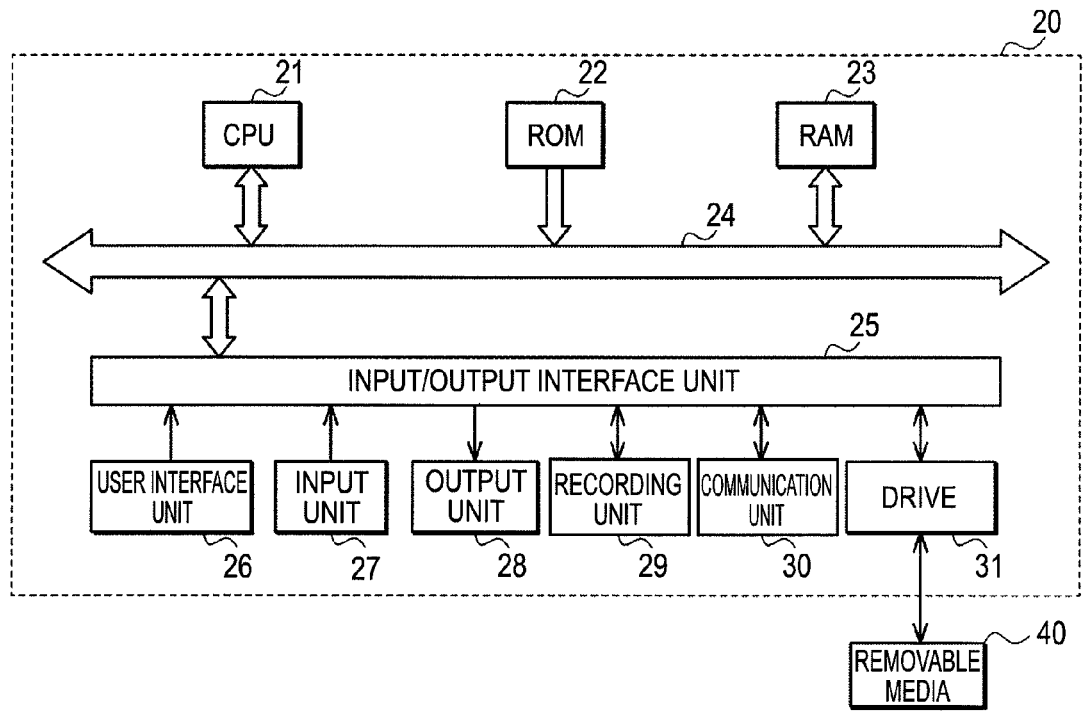
FIG. 2 is a diagram illustrating the configuration of a node.

FIG. 2 shows the configuration of a node. FIG. 2 illustrates, as an example, a case in which a computer is used as the node.

A CPU (Central Processing Unit) 21 of a node 20 executes various types of processes according to a computer program recorded in a ROM (Read Only Memory) 22 or a recording unit 29.

A RAM (Random Access Memory) 23 stores computer programs executed by the CPU 21, data, and the like, as appropriate. The CPU 21, the ROM 22, and the RAM 23 are connected to each other by a bus 24. An input/output interface unit 25 is connected to the CPU 21 via the bus 24. A user interface unit 26, an input unit 27, an output unit 28, the recording unit 29, a communication unit 30, a drive unit 31, and so forth are connected to the input/output interface unit 25.

The user interface unit 26 includes a keyboard, a pointing device, a remote control signal receiving unit, and the like, and it supplies an operation signal according to a user operation to the CPU 21. The input unit 27 performs data processing for information, such as image and voice data, supplied from an external device (not shown), and converts it into data that can be processed by a computer. The output unit 28 converts and outputs the information, such as image and voice data, to be output to the external device into data compatible with the external device.

The recording unit 29 includes, for example, a harddisk and a semiconductor memory. It records computer programs executed by the CPU 21 and various information, such as image and voice data. The communication unit 30 is for connecting the node 20 to the network, and the node 20 communicates with other nodes on the network through the communication unit 30. Various data and computer programs acquired from other nodes through the communication unit 30 are recorded in, for example, the RAM 23 or the recording unit 29, and they are read out by the CPU 21 as needed. When the ROM 22 is rewritable, the computer program stored in the ROM 22 may be updated by a computer program acquired through the communication unit 30.

The drive unit 31 is provided for reading out various data and computer programs recorded in a removable medium 40 that is mounted, such as a magnetic disk, an optical disk, a magneto-optical disk, or a semiconductor memory. The computer program that is read out therefrom may be processed in the same way as the computer program that is acquired by the communication unit 30.

The CPU 21 executes a computer program to process the information that is supplied through the input unit 27 and the information that is read out from the recording unit 29 and the removable medium 40 mounted in the drive unit 31. In addition, the CPU 21 controls communication with other nodes through the overlay network.

Here, routing information used for communicating with other nodes through the network is stored in a routing information storing unit. For example, node information indicating a succeeding node and preceding node is stored as the routing information in the RAM 23 or the ROM 22 that is made rewritable. When an inaccessible node occurs, a routing information updating unit updates the routing information so that routing can be performed without using the inaccessible node. For example, the CPU 21 updates the node information stored in the ROM 22 or the RAM 23 to enable self-recovery of the network so that routing can be performed without using the inaccessible node.

The overlay network 12 is configured over the network 11, for example, over an IP network, using a distributed hash table (DHT: Distributed Hash Table). Next, an algorithm utilizing a distributed hash table will be explained.

As described above, in the network system 10, the ring overlay network 12 is constructed over the IP network 11 using a distributed hash table. The overlay network 12 is a network forming a virtual ring that uses the IP network 11.

Each of the nodes that participates the overlay network 12 has a node ID, which is the identification information that is unique to the node. This node ID uses a hash value of a certain number of digits, obtained by hashing an IP address or a serial number using a common hash function (for example, SHA-1 (Secure Hash Algorithm 1) and the like). This node ID obtained by the common hash function is such that the probability of yielding the same value is very low when IP addresses or serial numbers are different. For this reason, each of the nodes on the overlay network 12, i.e., the network using a distributed hash table, is allowed to set a node ID that is unique to the node by hashing the IP address or the serial number using a common hash function.

In the Chord, which is a representative protocol that uses distributed hash technology, a hash value obtained by hashing an IP address or the like using a common hash function is used as a node ID, and the Chord ring, which is a ring overlay network, is constructed by arranging the nodes according to the node IDS in the clockwise order. Also, information indicating a successor, which is a succeeding node clockwise, and information indicating a predecessor, which is a preceding node clockwise, are stored as the routing information in each of the nodes on the Chord ring. Routing is performed utilizing the information of the successor and the predecessor. It should be noted that in the Chord, the routing information called Finger Table is also stored in the nodes, in order to increase the efficiency of the routing. However, this information does not ensure correctness of the connection of the nodes. Accordingly, the explanation thereof will be omitted.

In the case where communication is performed using the network using a distributed hash table, one predetermined node (hereinafter referred to as a "supernode") that is accessible on the network at all times is set in advance, in order that the network can be recovered even when an inaccessible node occurs. In addition, the identification information of the supernode is stored in all the nodes that participate the network so that they can access the supernode. For example, each of the nodes stores the IP address of the supernode. Thus, when the IP address of the supernode is stored in each node, the node ID of the supernode can be found by hashing the IP address using a common hash function.

Next, a network recovery process for the case where an inaccessible node occurs will be described. When an inaccessible node occurs, that is, when a node has no accessible successor, the node detects a new successor by executing a recovery algorithm, to perform recovery of the network. It should be noted that the condition in which there is no accessible successor and the Chord ring is broken will be referred to as a broken ring.

In the recovery algorithm, the routing information updating unit of the node having no accessible successor acquires information that indicates the predecessors using the predetermined node, i.e., the supernode, as the starting point, traces the nodes anticlockwise, and determines whether each of the traced nodes can become its successor. Here, when the node satisfies determination criteria, it updates the node information stored in the routing information storing unit and designates the node to be a new successor. Also, the routing information updating unit notifies the new successor that it becomes the predecessor of the new successor, so as to establish the path between it and the successor.

Figures 3, 4, 5:
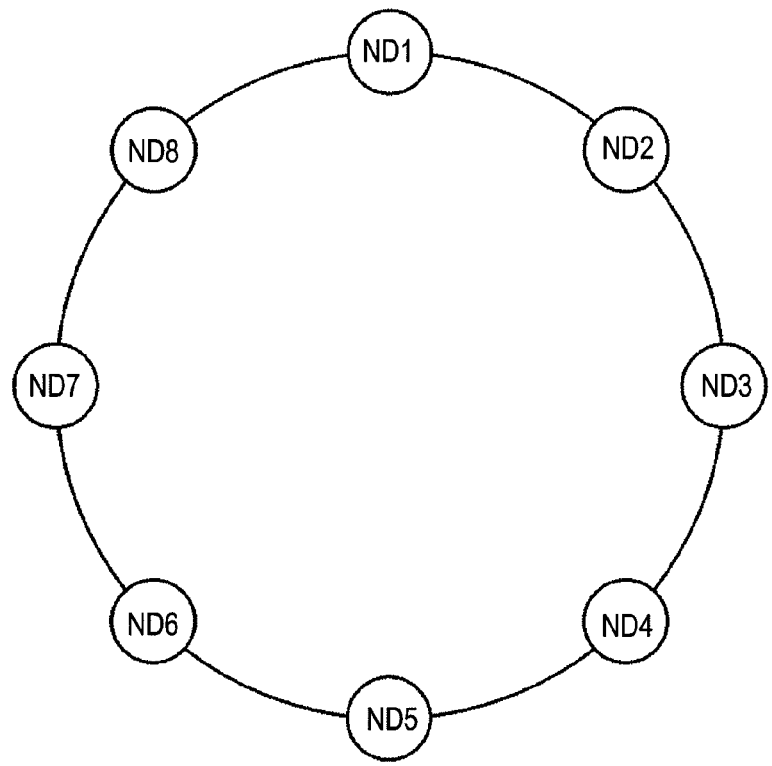
FIG. 3 is a view illustrating a recovery algorithm executed in a node that has no accessible successor.
FIG. 4 is a view illustrating a recovery algorithm executed in a node to which a notification to become a predecessor is provided.
FIG. 5 is a diagram illustrating a Chord ring.

FIG. 3 is a view illustrating a recovery algorithm executed in a node n that has no accessible successor. The node n uses a node n' as the supernode and acquires the node information indicating a predecessor from the node n'.

The node n designates the node n' as the successor of the node n if the acquired node information indicates that there is no predecessor (n'.predecessor is nil) or if the node n is located between the predecessor indicated by the acquired node information and the node n' (n∈(n'.predecessor, n')). In addition, the node n notifies the node n' that it becomes the predecessor of the node n' (n'.notify (n)).

In addition, the node n designates the predecessor indicated by the acquired node information as the node n' (n'=n'.predecessor) in another case, i.e., in the case where the node n is not located from the predecessor indicated by the acquired node information to the node n'. Then, it acquires predecessor node information from the newly designated node n' and performs the above-described process.

The routing information updating unit of the node supplied with a notification that a node becomes its predecessor determines whether or not the node that has supplied the notification satisfies determination criteria to be the predecessor. If the determination criteria are satisfied, it sets the node that has supplied the notification as its predecessor. If the determination criteria are not satisfied, it does not update the node information indicating its predecessor.

FIG. 4 is a view illustrating a recovery algorithm executed in the node n' supplied with a notification that a node becomes its predecessor. The node n' designates the node n indicated by the notification "notify" as its predecessor if the designated predecessor becomes inaccessible and there is no predecessor or if the node n indicated by the notification "notify" is located between the predecessor of the node n' and the node n'. In other cases, the node n' does not update the node information.

It should be noted that when there are a plurality of nodes that have no accessible successor, each of the nodes executes the above-described recovery algorithm.

Next, the recovery operation will be described in detail. FIG. 5 shows a Chord ring, in which the overlay network includes a node ND1 to a node ND8. The routing advances in the clockwise direction. For example, the successor of the node ND1 is the node ND2, and the predecessor of the node ND1 is the node ND8. In the following description, it is assumed that the supernode, which is the node that is accessible online at all times in the overlay network, is the node ND1.

Figure 6:
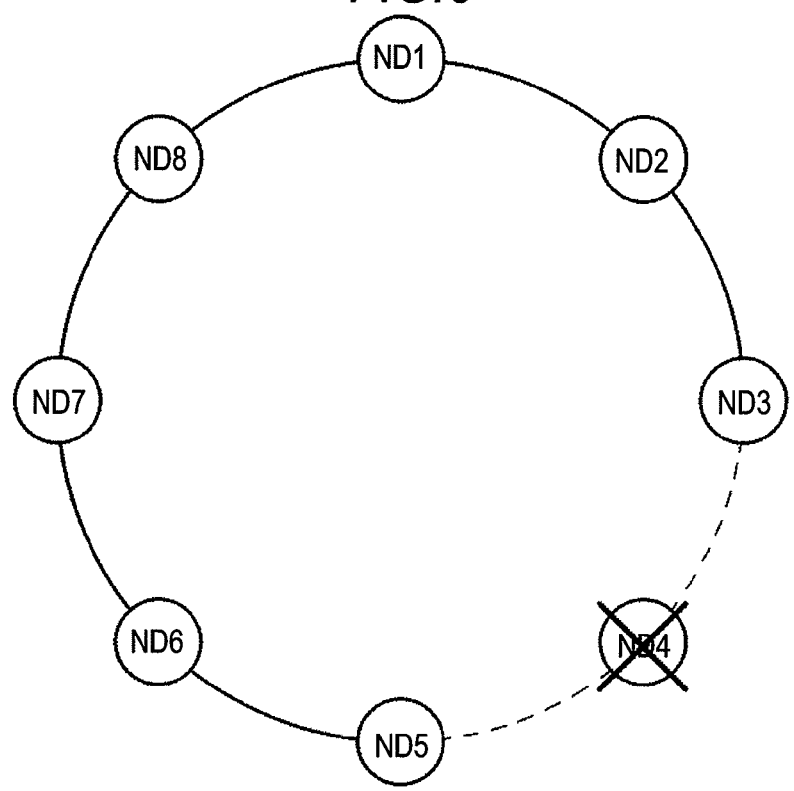
FIG. 6 is a diagram illustrating a Chord ring before recovery.

In the Chord ring configured in this way, when the node ND4 becomes inaccessible, the Chord ring before recovery is the one shown in FIG. 6. The node ND3 cannot access the node ND4, which is its successor, so it executes the recovery algorithm shown in FIG. 3. It should be noted that the dash-dot lines in FIG. 6 and the later-described FIG. 10 indicate the paths that have become inaccessible.

Figure 7:
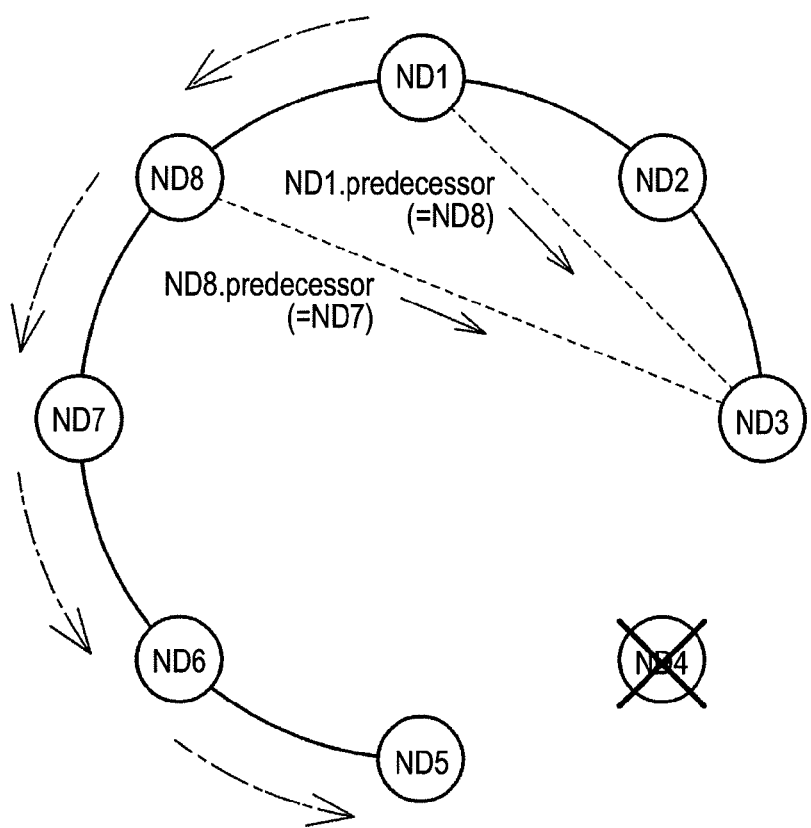
FIG. 7 is a diagram illustrating the Chord ring that is being recovered.

The node ND3 acquires the predecessor node information from the supernode ND1, as shown in FIG. 7. Here, the node information acquired from the supernode ND1 indicates the node ND8 as the predecessor. The node ND3 determines whether or not the supernode ND1 can become its successor based on the node information acquired from the supernode ND1. The node information acquired from the supernode ND1 indicates the node ND8 as the predecessor, and the node ND3 is not located between the node ND8, which is the predecessor indicated by the acquired node information, and the node ND1. Accordingly, the node ND3 determines that the node ND1 cannot become its successor. The node ND3 designates the node ND8 as the node n' of FIG. 3, which the request target of the node information, and determines whether or not the next node ND8 can become its successor.

The node ND3 acquires the node information indicating the predecessor from the node ND8. Here, the node information acquired from the node ND8 indicates the node ND7 as the predecessor. The node ND3 determines whether or not the node ND8 can become its successor based on the node information acquired from the node ND8. The node information acquired from the node ND8 indicates the node ND7 as the predecessor, and the node ND3 is not located between the node ND7, which is the predecessor indicated by the acquired node information, and the node ND8. Accordingly, the node ND3 determines that the node ND8 cannot become its successor. The node ND3 designates the node ND7 as the node n' of FIG. 3, which is the request target of the node information, and determines whether or not the next node ND8 can become its successor.

Thereafter, the same process is repeated to trace the nodes traced anticlockwise, and the node ND3 determines whether each of the traced nodes can become its successor.

Figure 8:
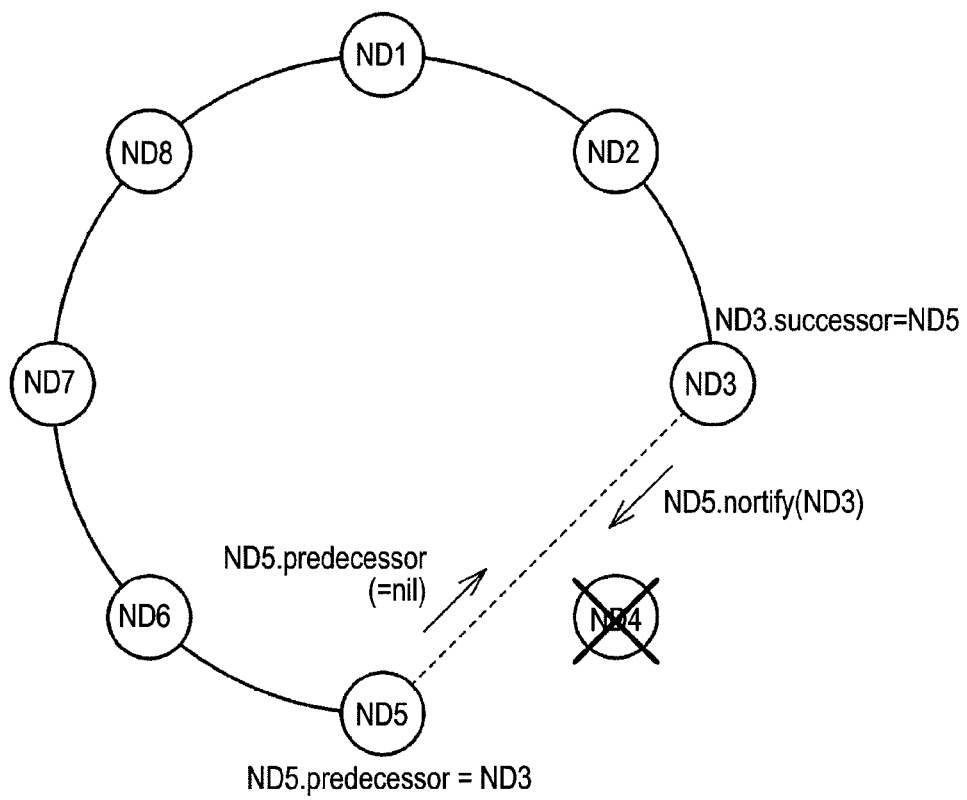
FIG. 8 is a diagram illustrating the Chord ring that is being recovered.

Thereafter, as shown in FIG. 8, the node ND3 acquires the node information indicating the predecessor from the node ND5. Here, the node ND4, which was the predecessor of the node ND1, is inaccessible, so the node information acquired from the node ND5 is "nil", which indicates that there is no predecessor.

Because the node information is "nil", the node ND3 determines that the node ND5 can become its successor, and it designates the node ND5 as the successor of the node ND3 (ND3.successor=ND5). In this way, routing can be performed correctly in the clockwise direction when the routing information is updated in the node ND3 so that the node ND5 becomes its successor.

The node ND5 is designated as the successor by the node ND3, but the predecessor of the node ND5 is not changed to the node ND3. Therefore, the routing information of the node ND5 does not indicate the connection of the nodes correctly. Accordingly, the node ND3 notifies its presence to the node ND5 so that it can become the predecessor of the node ND5 (ND5.notify(ND3)).

The node ND5 that has received the notification "notify" from the node ND3 determines whether or not the node ND3 satisfies the condition for becoming its predecessor. Here, since the node ND4 is inaccessible and there is no predecessor, the node ND5 designates the node ND3 as the predecessor of the node ND5 by the recovery algorithm of FIG. 4 (ND5.predecessor=ND3).

Figure 9:
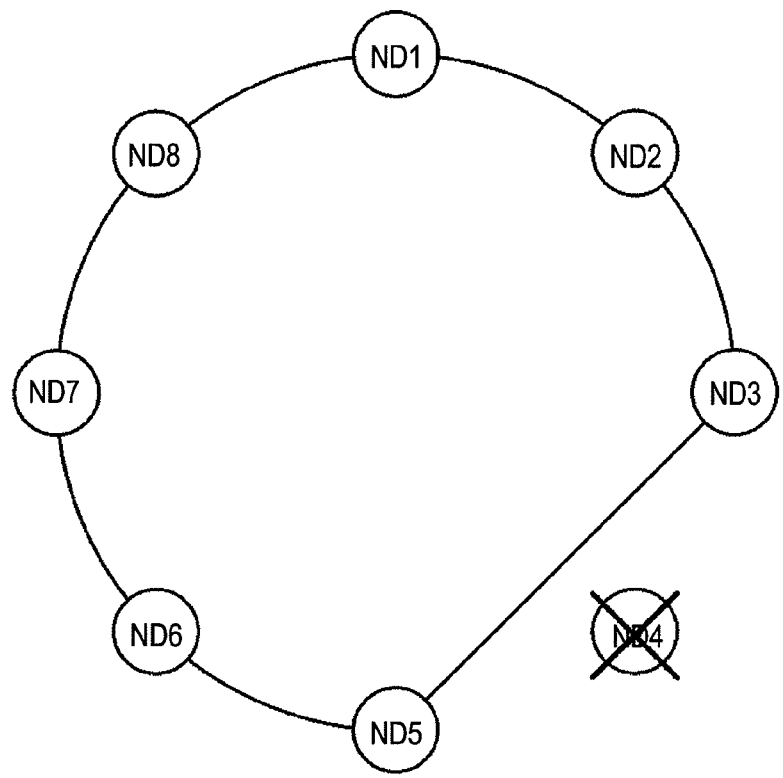
FIG. 9 is a diagram illustrating the Chord ring after recovery.

By performing such a process, the successor of the node ND3 is changed to the node ND5 and the predecessor of the node ND5 is changed to the node ND3 automatically when the node ND4 becomes inaccessible. Thus, the Chord ring can be recovered automatically, as shown in FIG. 9.

Figure 10:
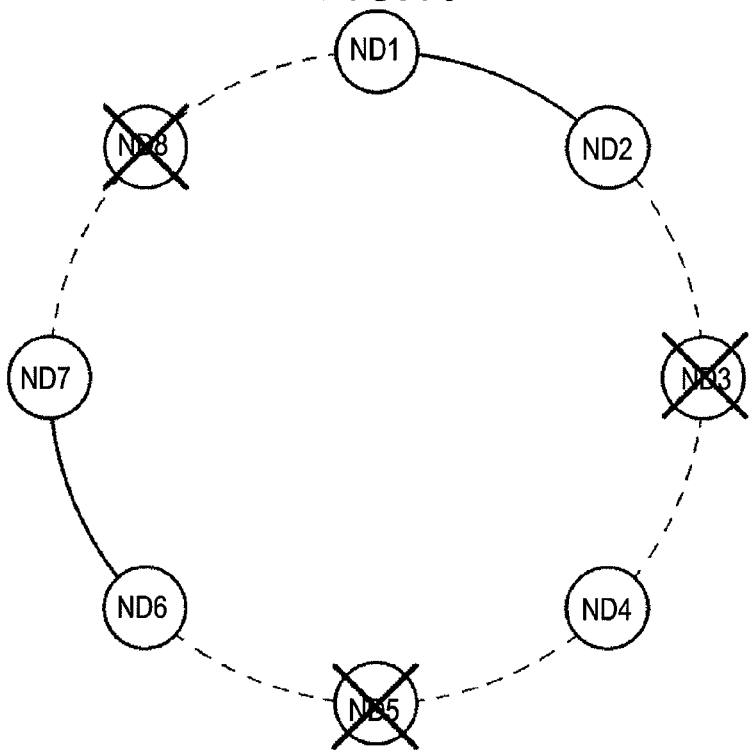
FIG. 10 is a diagram illustrating a Chord ring before recovery.

Next, the recovery operation will be described for the case where a plurality of inaccessible nodes occur, for example, three nodes ND3, ND5, and ND8 became inaccessible, as shown in FIG. 10.

Figure 11:
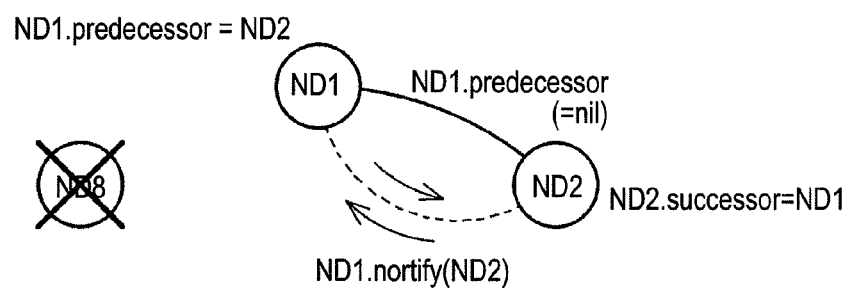
FIG. 11 is a diagram illustrating the Chord ring that is being recovered.
Figure 11:
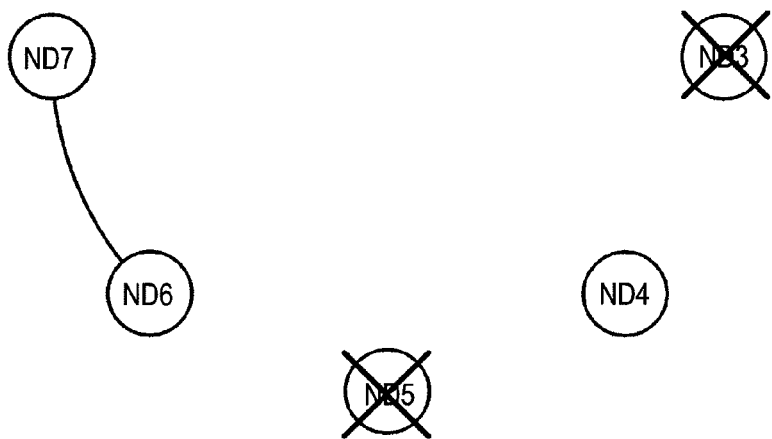

For example, the node ND2 executes the recovery algorithm because its successor, the node ND3, became inaccessible, and it acquires predecessor node information from the supernode ND1, as shown in FIG. 11. Here, the node ND8, which is the predecessor of the node ND5, is inaccessible, so the acquired node information is "nil", which indicates that there is no predecessor.

Because the predecessor indicated by the acquired node information is "nil", the node ND2 determines that the supernode ND1 can become its successor, and it designates the node ND1 as the successor of the node ND2. In addition, the node ND2 notifies its presence to the supernode ND1 so that it can become the predecessor of the supernode ND1 (ND1.notify(ND2)).

The supernode ND1 that has received the notification "notify" from the node ND2 determines whether or not the node ND2 satisfies the condition for becoming its predecessor. Here, since the node ND8 is inaccessible and there is no predecessor, the supernode ND1 designates the node ND2 as the predecessor of the supernode ND1 by the recovery algorithm of FIG. 4 (ND1.predecessor=ND2).

Figures 12, 13:
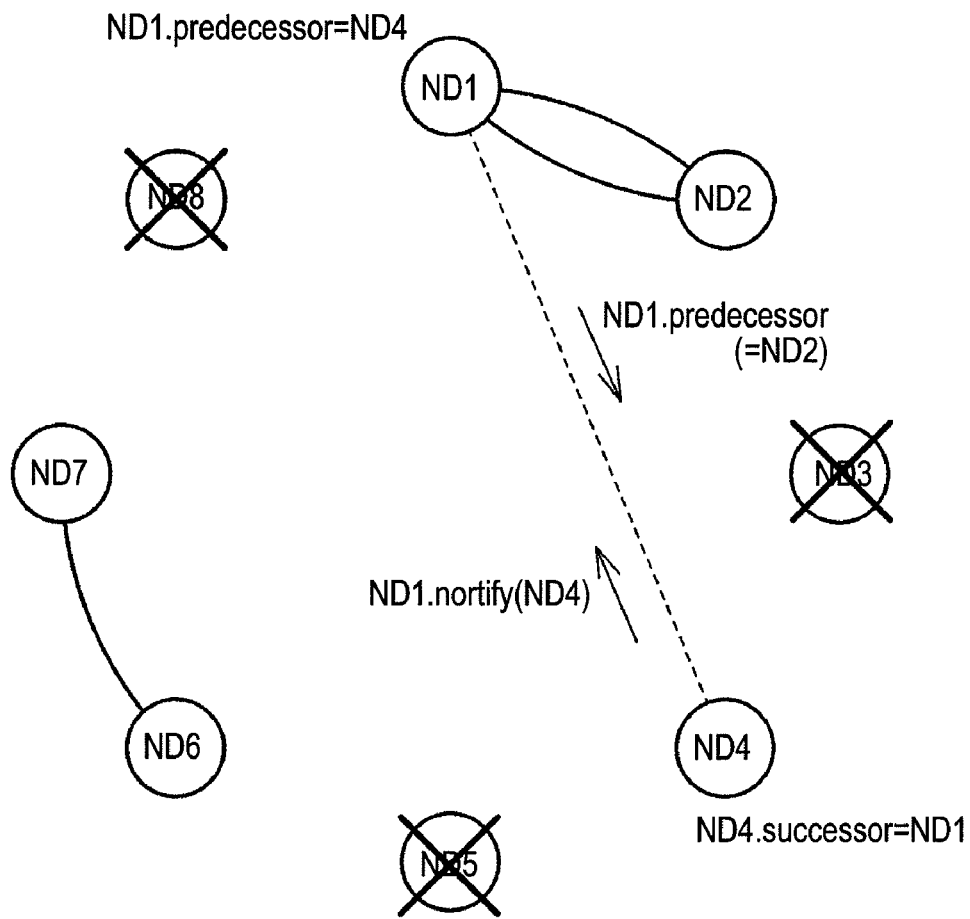
FIG. 12 is a diagram illustrating the Chord ring that is being recovered.
FIG. 13 is a view illustrating the algorithm of Stabilize.

When such a process is performed, a Chord ring including the supernode ND1 and the node ND2 is formed temporarily, as shown in FIG. 12.

In the Chord, each node runs Stabilize periodically in order to update the routing information including the successor or the like.

FIG. 13 shows the algorithm of Stabilize. When a node n runs Stabilize, the node n requests node information indicating the predecessor from the successor, and designates the node indicated by the acquired node information as a node x. Further, the node n determines whether or not the node x can become its new successor. The node n designates the node x as its successor when the node x is located between the node n and the successor of the node n. On the other hand, the node n does not change its successor when the node x is not located between the node n and the successor of the node n.

As shown in FIG. 12, after the recovery in the node ND2 has completed, the node ND4 executes the recovery algorithm because the successor of the node ND4; the node ND5, for example, is inaccessible. Then, the node ND4 acquires predecessor node information from the supernode ND1. Here, since the recovery algorithm was executed in the node ND2, the predecessor of the supernode ND1 has been designated as the node ND2. The node determines whether or not the supernode ND1 can become its successor based on the node information acquired from the supernode ND1. The node information acquired from the supernode ND1 indicates the node ND2 as the predecessor, and the node ND4 is located between the node ND2, which is the predecessor indicated by the acquired node information, and the supernode ND1. Therefore, the node ND4 designates the supernode ND1 as its successor (ND4.successor=ND1). In addition, the node ND4 notifies its presence to the supernode so that it can become the predecessor of the supernode ND1 (ND1.notify(ND4)).

The supernode ND1 that has received the notification "notify" from the node ND4 determines whether or not the node satisfies the condition for becoming its predecessor. Because the node ND4 is located between the node ND2, which is the predecessor of the node ND1, and the node ND1, the supernode ND1 designates the node ND4 as the predecessor of the node ND1 (ND1.predecessor=ND4).

Figure 14:
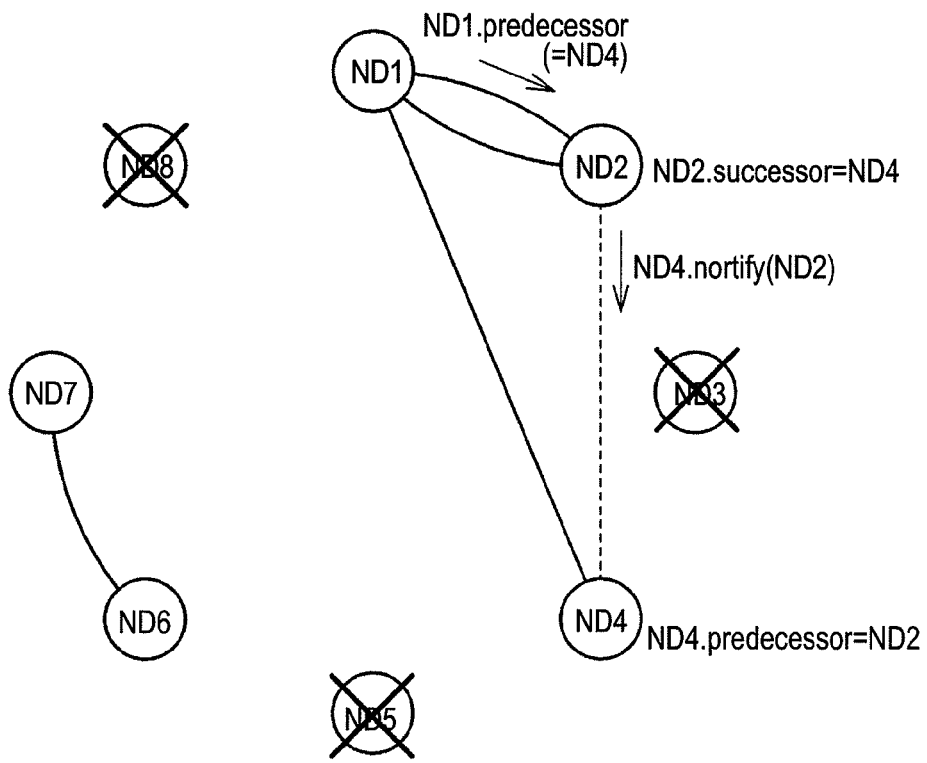
FIG. 14 is a diagram illustrating the Chord ring that is being recovered.

When such a process is performed, a path connecting the node ND1 to the node ND4 is formed, as shown in FIG. 14. In addition, when the node ND2 runs Stabilize under this condition, the node ND2 acquires node information indicating the predecessor from the supernode ND1, which is its successor, and it determines whether or not the node indicated by the acquired node information can become the new successor of the node ND2. It should be noted that, since the recovery algorithm was executed in the node ND4, the predecessor of the supernode ND1 has been designated as the node ND4. Therefore, the node information acquired from the supernode ND1, which indicates its predecessor, indicates the node ND4.

The node 2 determines whether or not the predecessor of the supernode ND1 can become its new successor. Here, the predecessor of the supernode ND1 is the node ND4, and the node ND4 is located between the node ND2 and the supernode ND1, which is the successor of the node ND2. Therefore, the node ND2 designates the node ND4 as its successor (ND2.successor=ND4). In addition, the node ND2 notifies its presence to the node ND4 so that it can become the predecessor of the node ND4 (ND4.notify(ND2)).

The node ND4 that has received the notification "notify" from the node ND2 determines whether or not the node ND2 satisfies the condition for becoming its predecessor. Here, since the node ND3 is inaccessible and there is no predecessor, the node ND4 designates the node ND2 as the predecessor of the node ND4 by the recovery algorithm of FIG. 4 (ND4.predecessor=ND2).

Figure 15:
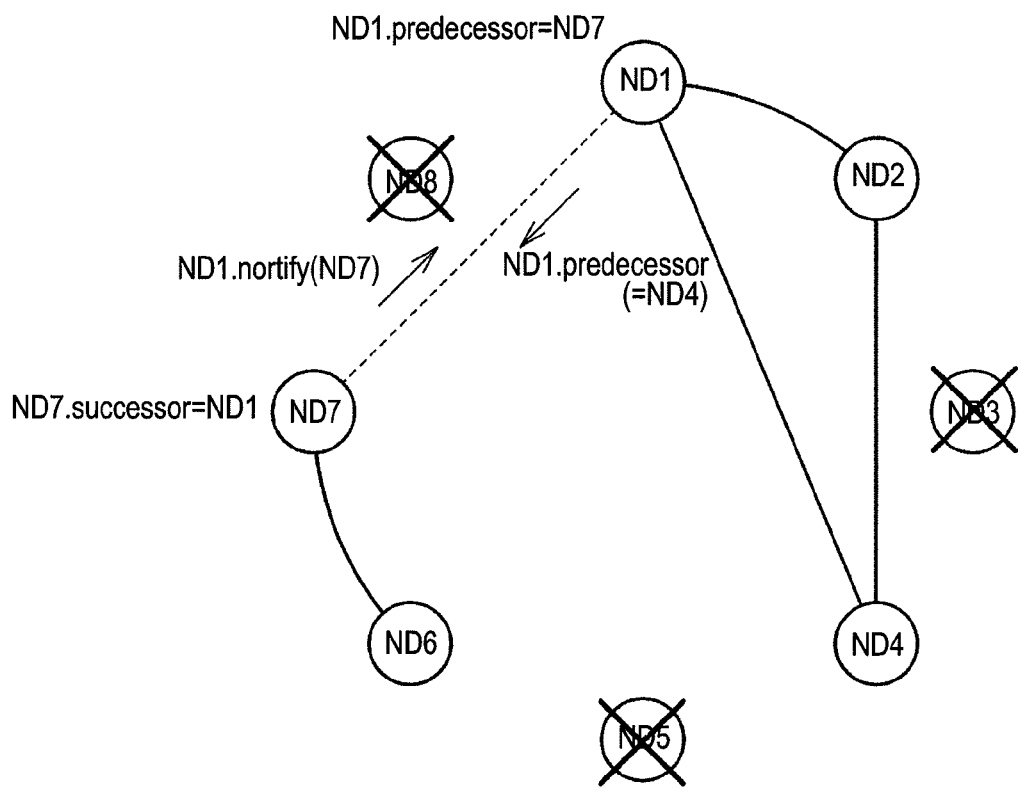
FIG. 15 is a diagram illustrating the Chord ring that is being recovered.

When such a process is performed, a Chord ring including the supernode ND1, the node ND2, and the node ND4 is formed, as shown in FIG. 15.

When the recovery in the node ND2 and the node ND4 is completed and the recovery algorithm is executed in, for example, the node ND7, the node ND7 acquires predecessor node information from the supernode ND1. Here, since the recovery algorithm was executed in the node ND2 and the node ND4, the predecessor of the supernode ND1 has been designated as the node ND4. The node ND7 determines whether or not the supernode ND1 can become its successor based on the node information acquired from the supernode ND1. The node information acquired from the supernode ND1 indicates the node ND4 as the predecessor, and the node ND7 is located between the node ND4, which is the predecessor indicated by the acquired node information, and the supernode ND1. Therefore, the node ND7 designates the supernode ND1 as its successor (ND7.successor=ND1). In addition, the node ND7 notifies its presence to the supernode ND1 so that it can become the predecessor of the supernode ND1 (ND1.notify(ND7)).

The supernode ND1 that has received the notification "notify" from the node ND7 determines whether or not the node ND7 satisfies the condition for becoming its predecessor. Because the node ND7 is located between the node ND4, which is the predecessor of the node ND1, and the node ND1, the supernode ND1 designates the node ND7 as the predecessor of the node ND1 (ND1.predecessor=ND7).

Figure 16:
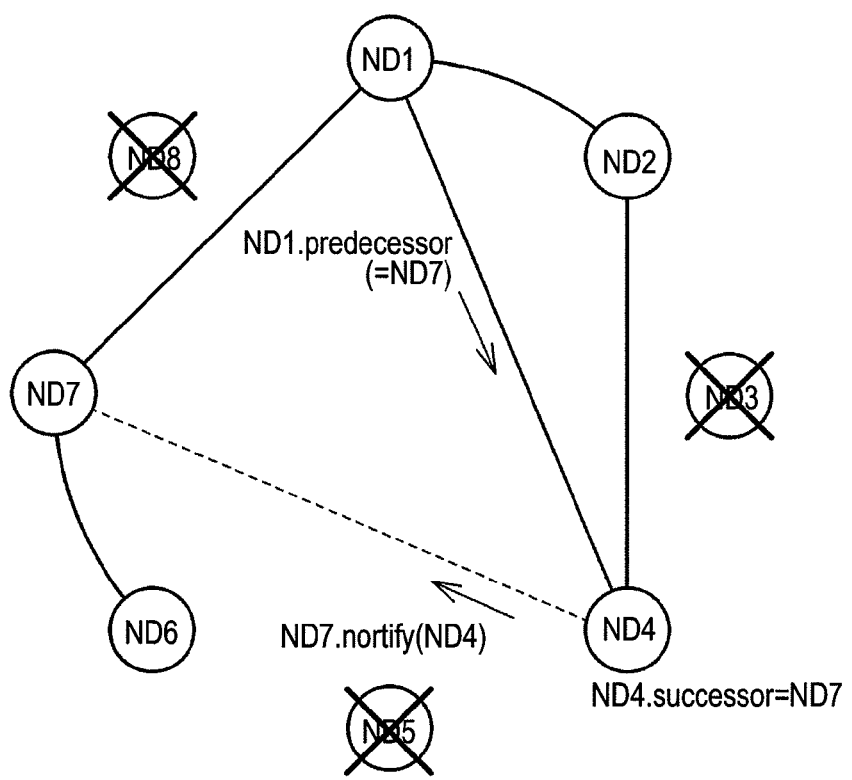
FIG. 16 is a diagram illustrating the Chord ring that is being recovered.

When such a process is performed, a path connecting the node ND1 to the node ND7 is formed, as shown in FIG. 16. In addition, when the node ND4 runs Stabilize under this condition, the node ND4 acquires node information indicating the predecessor from the supernode ND1, which is its successor, and it determines whether or not the node indicated by the acquired node information can become the new successor of the node ND4. It should be noted that, since the recovery algorithm was executed in the node ND7, the predecessor of the supernode ND1 has been designated as the node ND7. Therefore, the node information acquired from the supernode ND1, which indicates its predecessor, indicates the node ND7.

The node 4 determines whether or not the predecessor of the supernode ND1 can become its new successor. Here, the predecessor of the supernode ND1 is the node ND7, and the node ND7 is located between the node ND4 and the supernode ND1, which is the successor of the node ND4. Therefore, the node ND4 designates the node ND7 as its successor (ND4.successor=ND7). In addition, the node ND4 notifies its presence to the node ND7 so that it can become the predecessor of the node ND7 (ND7.notify(ND4)).

The node ND7 that has received the notification "notify" from the node ND4 determines whether or not the node ND4 satisfies the condition for becoming its predecessor. Here, the predecessor of the node ND7 is the node ND6, and the node ND4 is not located between the node ND6 and the node ND7. Accordingly, the node ND7 determines that the node ND4 does not satisfy the condition for becoming its predecessor, and it does not change its predecessor from the node ND6 to the node ND4.

Even when Stabilize is run by another node, for example, by the node 6, after the path connecting the node ND1 to the node ND7 has been formed, the topology of the Chord ring is not affected. Specifically, when the node information indicating the "Predecessor" is requested for the node ND7, which is the successor of the node ND6, the node information indicates the node ND6. Therefore, the successor of the node ND6 is not changed, so the topology is not affected.

Figure 17:
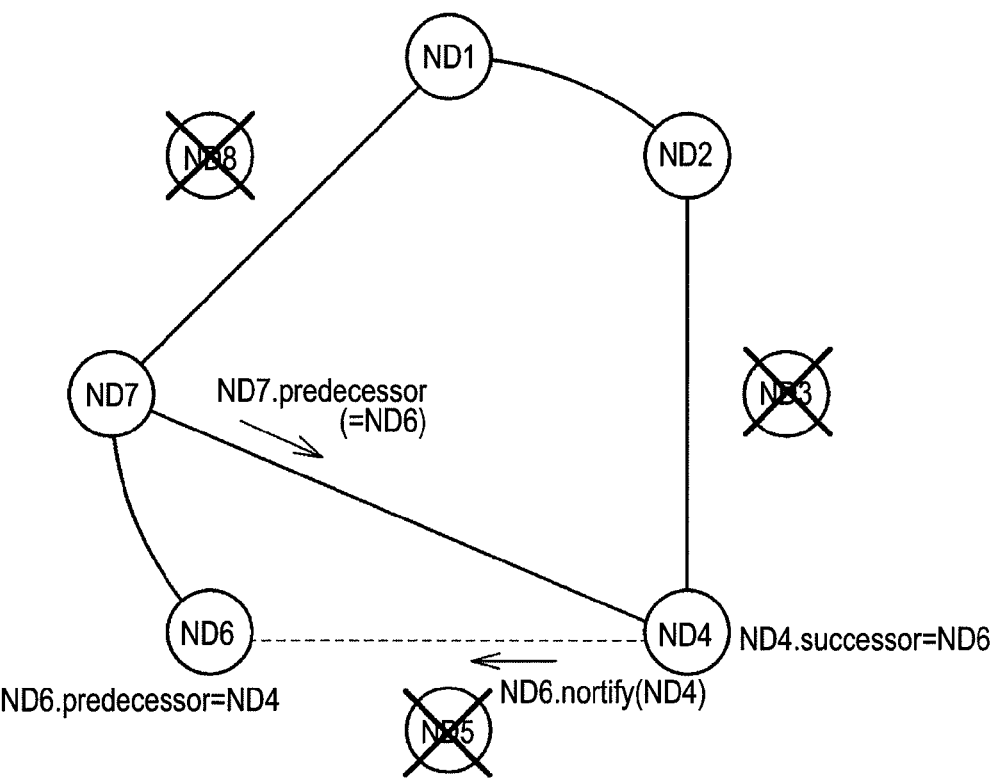
FIG. 17 is a diagram illustrating the Chord ring that is being recovered.

When the node ND4 runs Stabilize again under the condition in which the path connecting the node ND1 and the node ND7 is formed, the node ND4 acquires node information indicating the predecessor from the node ND7, which is its successor, as shown in FIG. 17. Then, the node ND4 determines whether or not the node indicated by the acquired node information can become the new successor of the node ND4. It should be noted that the predecessor of the node ND7 has been designated as the node ND6, as described above. Therefore, the node information acquired from the node ND7, which indicates its predecessor, indicates the node ND6.

The node 4 determines whether or not the predecessor of the node ND7 can become its new successor. Here, the predecessor of the node ND7 is the node ND6, and the node ND6 is located between the node ND4 and the node ND7, which is the successor of the node ND4. Therefore, the node ND4 designates the node ND6 as its successor (ND4.successor=ND6). In addition, the node ND4 notifies its presence to the node ND6 so that it can become the predecessor of the node ND6 (ND6.notify(ND4)).

The node ND6 that has received the notification "notify" from the node ND4 determines whether or not the node ND4 satisfies the condition for becoming its predecessor. Here, since the node ND5 is inaccessible and there is no predecessor, the node ND6 designates the node ND4 as the predecessor of the node ND6 by the recovery algorithm of FIG. 4 (ND6.predecessor=ND4).

Figure 18:
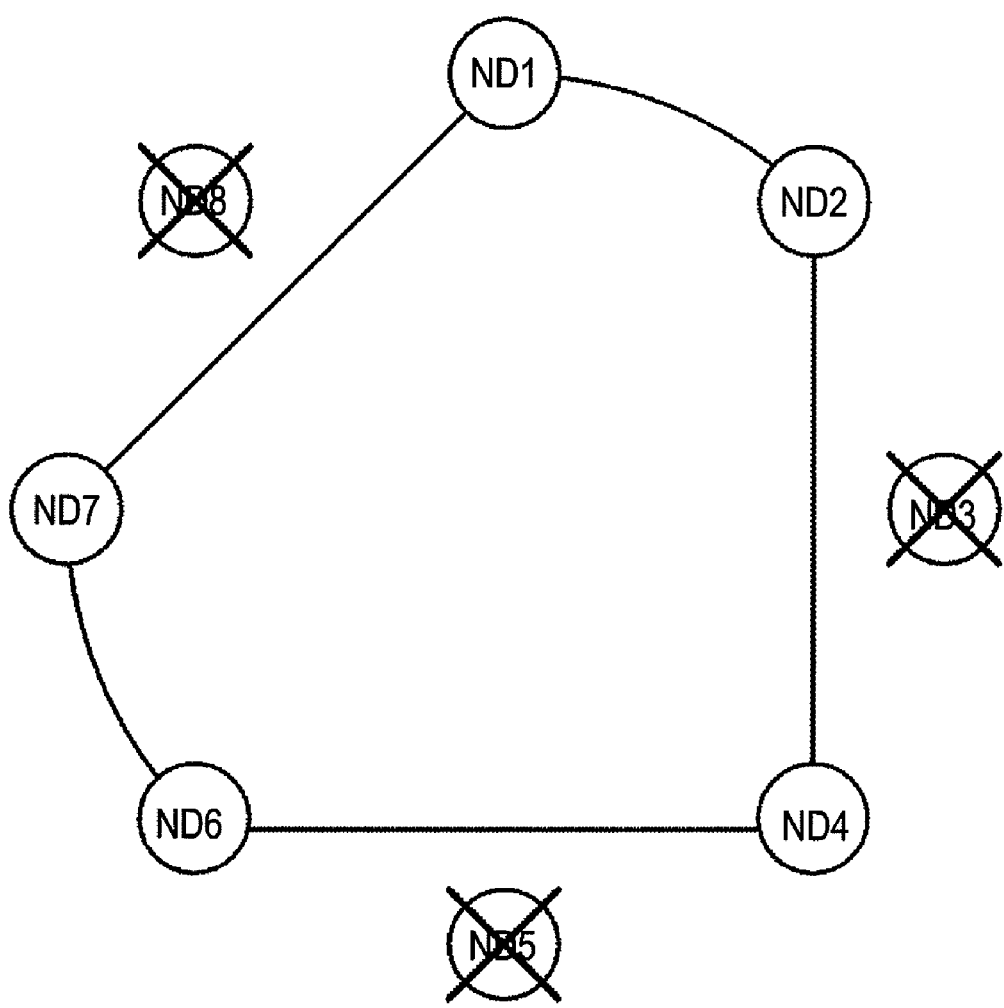
FIG. 18 is a diagram illustrating the Chord ring after recovery.

When such a process is performed, the inaccessible nodes ND3, ND5, and ND8 are eliminated, and a Chord ring including the supernode ND1, the nodes ND2, ND4, ND6, and ND7 can be formed, as shown in FIG. 18.

As described above, failed nodes can be eliminated and a Chord ring can be configured by executing the recovery algorithm in a node that has detected a failure and running Stabilize in the node.

In the foregoing description, the recovery algorithm is executed in the node ND4 after executing the recovery algorithm in the node ND2, and thereafter, the recovery algorithm is executed in the node ND7. However, the order of the nodes that perform the recovery algorithm is not limited to the above-described case. Even when the recovery algorithm is performed in any order, failed nodes can be eliminated and a Chord ring can be configured.

Figure 19:
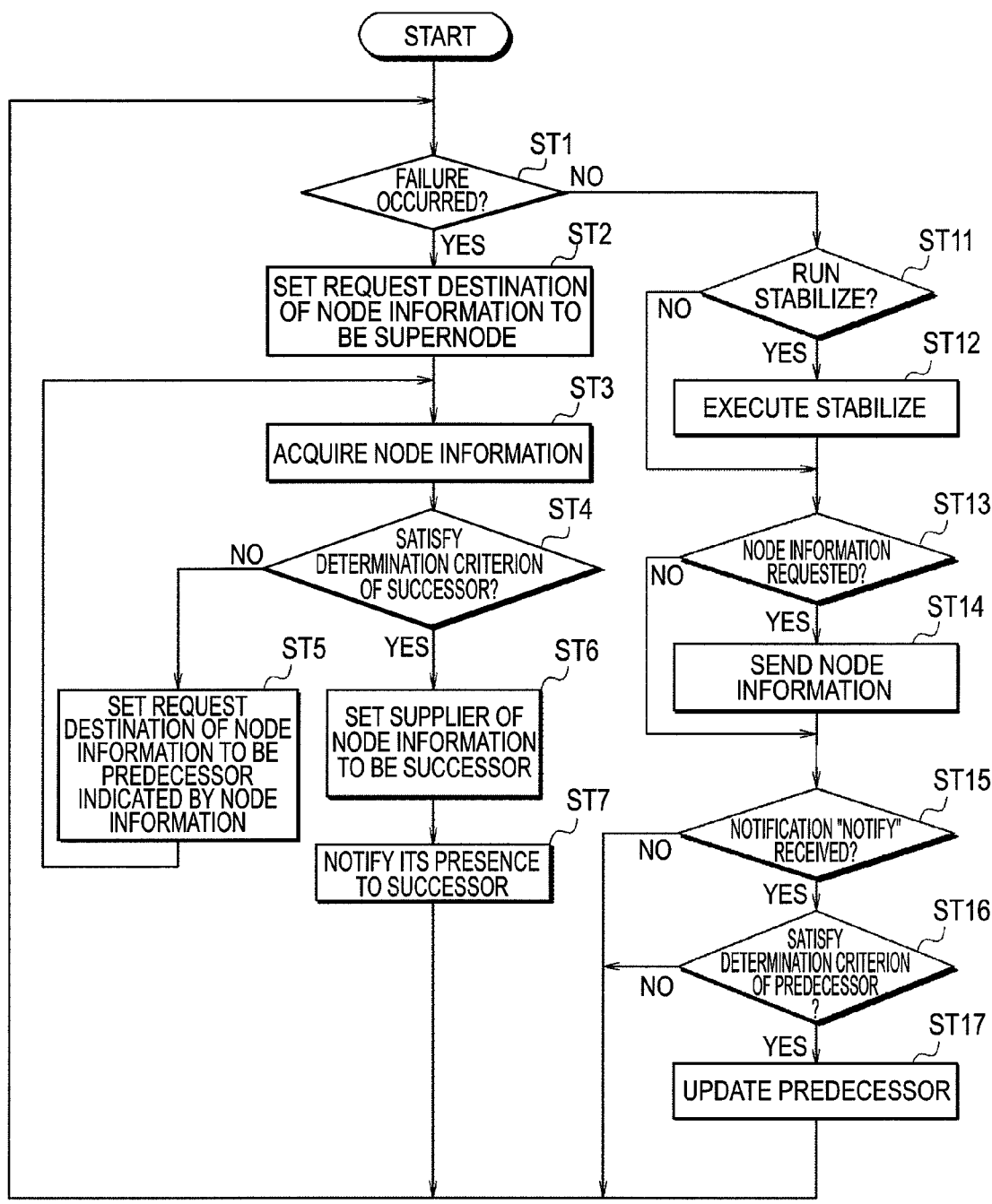
FIG. 19 is a flowchart illustrating an operation of a node.

FIG. 19 is a flow-chart showing the operation of a node when performing the above-described recovery operation. At step ST1, the CPU 21 determines whether or not a failure has occurred. When the CPU 21 determines that the successor has become inaccessible, the CPU 21 proceeds to step ST2, while if it determines that the successor is not inaccessible, the CPU 21 proceeds to step ST11.

At step ST2, the CPU 21 sets the request target of node information to be the supernode ND1, and it proceeds to step ST3.

At step ST3, the CPU 21 acquires node information. The CPU 21 acquires node information indicating the predecessor from the request target of the node information, and it proceeds to step ST4.

At step ST4, the CPU 21 determines whether or not the node indicated by the acquired node information satisfies the determination criterion for the successor. If the node indicated by the node information satisfies the determination criterion, i.e., if the acquired node information is "nil", or if its own node is located between the node indicated by the node information and the node that is the supplier of the node information, the CPU 21 determines that the node indicated by the node information satisfies the determination criterion, and it proceeds to step ST6. Alternatively, if the node indicated by the node information does not satisfy the determination criterion, the CPU 21 proceeds to step ST5.

At step ST5, the CPU 21 sets the request target of node information to be the predecessor indicated by the node information. The CPU 21 sets the predecessor indicated by the acquired node information shown in step ST3 as the request target of node information, and it returns to step ST3. When the process from step ST2 through step ST5 is performed in this way, the nodes can be traced anticlockwise using the supernode as the starting point, and it can be determined whether each of the traced nodes can become its successor.

At step ST6, the CPU 21 sets the request target of node information to be the successor, and it proceeds to step ST7.

At step ST7, the CPU 21 notifies its presence to the successor. The CPU 21 gives the newly set successor a notification "notify" that its own node becomes the predecessor, and it returns to step ST1.

When the process proceeds from step ST1 to step ST11, the CPU 21 determines at step ST11 whether or not Stabilize is run. In the Chord, Stabilize is run periodically, as described above. Accordingly, the CPU 21 determines whether or not it is the timing for running Stabilize. If it is determined that it is the timing for running Stabilize, the CPU 21 proceeds to step ST12, while if it is determined that it is not the timing for running Stabilize, the CPU 21 proceeds to step ST13.

At step ST12, the CPU 21 runs Stabilize, and it proceeds to step ST13.

At step ST13, the CPU 21 determines whether or not the node information has been requested from other nodes. If the node information has been requested, the CPU 21 proceeds to step ST14, while if the node information has not been requested, the CPU 21 proceeds to step ST15.

At step ST14, the CPU 21 supplies node information indicating the predecessor to the node that has requested the node information, and it proceeds to step ST15.

At step ST15, the CPU 21 determines whether or not it has received the notification "notify". If the CPU 21 has received the notification "notify", it proceeds to step ST15, while if it has not received the notification "notify", it returns step ST1.

At step ST16, the CPU 21 determines whether or not the node that is the supplier of the notification "notify" satisfies the determination criterion for the predecessor. If the node that is the supplier of the notification "notify" satisfies the determination criterion, i.e., if the designated predecessor becomes inaccessible and no predecessor is designated, or if the node that is the supplier of the notification "notify" is located between the node indicated by the predecessor and its own node, the CPU 21 determines that the node that is the supplier of the notification "notify" satisfies the determination criterion, and it proceeds to step ST17. Alternatively, if the node that is the supplier of the notification "notify" does not satisfy the determination criterion, the CPU 21 returns to step ST1.

At step ST17, the CPU 21 updates the predecessor. The CPU 21 sets the node that is the supplier of the notification "notify" to be its new predecessor, and it returns to step ST1.

It should be noted that the order of the process pertaining to Stabilize, the process responding to the request for the node information, and the process pertaining to the notification "notify" is not limited to the order shown in FIG. 19, and any of the processes may take precedence.

Even when an inaccessible node occurs, the inaccessible node can be eliminated, and self-recovery of the Chord ring is made possible by performing the recovery algorithm in each of the nodes as described above. Moreover, the above-described recovery algorithm utilizes only the function (API) provided by the Chord protocol. In other words, it is unnecessary to add a new function, so the recovery algorithm can be realized easily.

The number of nodes and the locations of inaccessible nodes in the above-described embodiments are merely illustrative and should not be understood as limiting. It will be apparent to those skilled in the art that various modifications and alterations can be made to the embodiments without departing from the scope of the invention, and it should be understood that the scope of the invention is defined by the appended claims.

The communication node, the communication method, and the computer program according to embodiments of the invention enable a network to recover automatically when an inaccessible node occurs, by updating node information indicating a succeeding node or a preceding node so as to eliminate the inaccessible node. Therefore, they are suitable for P2P networks or the like.

The present application contains subject matter related to that disclosed in Japanese Priority Patent Application JP 2008-193429 filed in the Japan Patent Office on Jul. 28, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A communication node comprising:
   a routing information storing unit configured to store, as routing information, node information indicating a succeeding node and a preceding node in a ring network using a distributed hash table; and
   a routing information updating unit configured to update the node information stored in the routing information storing unit, wherein
   when the succeeding node becomes inaccessible, the routing information updating unit acquires node information indicating a preceding node from one predetermined node that is made accessible on the network at all times, and based on the acquired node information, the routing information updating unit determines whether or not the node that has supplied the node information satisfies a determination criterion for becoming its succeeding node; the routing information updating unit designates the node that has supplied the node information as its succeeding node if the determination criterion for becoming the succeeding node is satisfied, while the routing information updating unit acquires node information from the preceding node indicated by the acquired node information if the determination criterion for becoming the succeeding node is not satisfied; and the routing information updating unit determines whether or not the node that has supplied the node information satisfies the determination criterion for becoming its succeeding node.

2. The communication node as set forth in claim 1, wherein the routing information updating unit determines that a determination criterion for becoming the succeeding node is satisfied if it is located between the preceding node indicated by the node information and the node that has supplied the node information indicating the preceding node, or if the node information indicates no preceding node.

3. The communication node as set forth in claim 2, wherein, if the node that has supplied the node information is designated as the succeeding node, the routing information updating unit notifies, to the node that has supplied the node information, that it becomes a preceding node of the node that has supplied the node information.

4. The communication node as set forth in claim 3, wherein, when the notification for becoming a preceding node is supplied, the routing information updating unit determines whether or not the node that has supplied the notification satisfies the determination criterion for becoming the preceding node, and the routing information updating unit designates the node that has supplied the notification as the preceding node if the determination criterion for becoming the preceding node is satisfied, while the routing information updating unit does not update the node information indicating the preceding node if the determination criterion for becoming the preceding node is not satisfied.

5. The communication node as set forth in claim 4, wherein the routing information updating unit determines that the determination criterion for becoming the preceding node is satisfied when its preceding node is inaccessible, or when the node that has supplied the notification for becoming the preceding node is located between it and its preceding node.

6. The communication node as set forth in claim 1, wherein the routing information updating unit updates the node information stored in the routing information storing unit periodically.

7. A communication method comprising the steps of:
   acquiring node information indicating a preceding node from a predetermined one node that is made accessible at all times on the network by a routing information updating unit when a succeeding node in a ring network using a distributed hash table becomes inaccessible; and
   by the routing information updating unit, determining whether or not the node that has supplied the node information satisfies a determination criterion for becoming a succeeding node based on the acquire node information; setting the node that has supplied the node information to be the succeeding node if it satisfies the determination criterion for becoming the succeeding node; acquiring the node information from the preceding node indicated by the acquired node information if it does not satisfy the determination criterion for becoming the succeeding node; and determining whether or not the node that has supplied the node information satisfies the determination criterion for becoming the succeeding node.

8. A computer program for causing a computer connected to a ring network using a distributed hash table to execute the steps of:
   acquiring node information indicating a preceding node from one predetermined node that is made accessible at all times on the network when a succeeding node on the network becomes inaccessible; and
   determining whether or not the node that has supplied the node information satisfies a determination criterion for becoming a succeeding node based on the acquire node information; setting the node that has supplied the node information to be the succeeding node if it satisfies the determination criterion for becoming the succeeding node; acquiring the node information from the preceding node indicated by the acquired node information if it does not satisfy the determination criterion for becoming the succeeding node; and determining whether or not the node that has supplied the node information satisfies the determination criterion for becoming the succeeding node.

* * * * *